May 23, 1967  G. W. URSCHEL  3,320,905
SYSTEM FOR PROCESSING A PRODUCT
Filed June 1, 1964  4 Sheets-Sheet 2
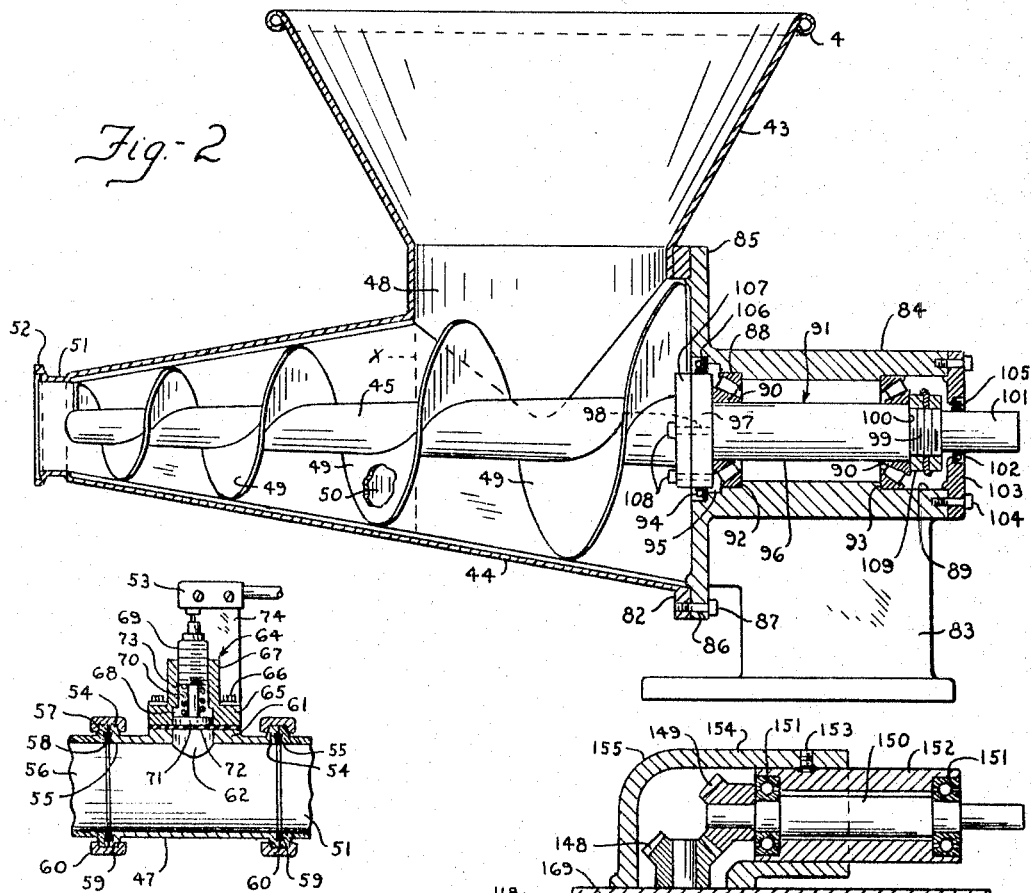
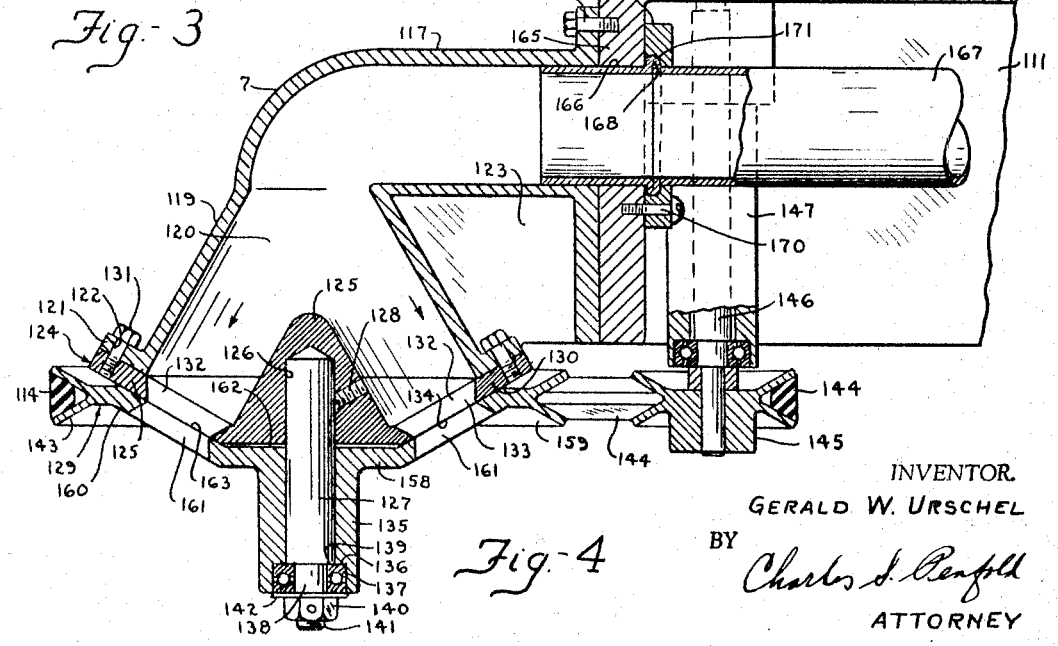
INVENTOR.
GERALD W. URSCHEL
BY
Charles J. Penfold
ATTORNEY May 23, 1967  G. W. URSCHEL  3,320,905
SYSTEM FOR PROCESSING A PRODUCT
Filed June 1, 1964  4 Sheets-Sheet 3

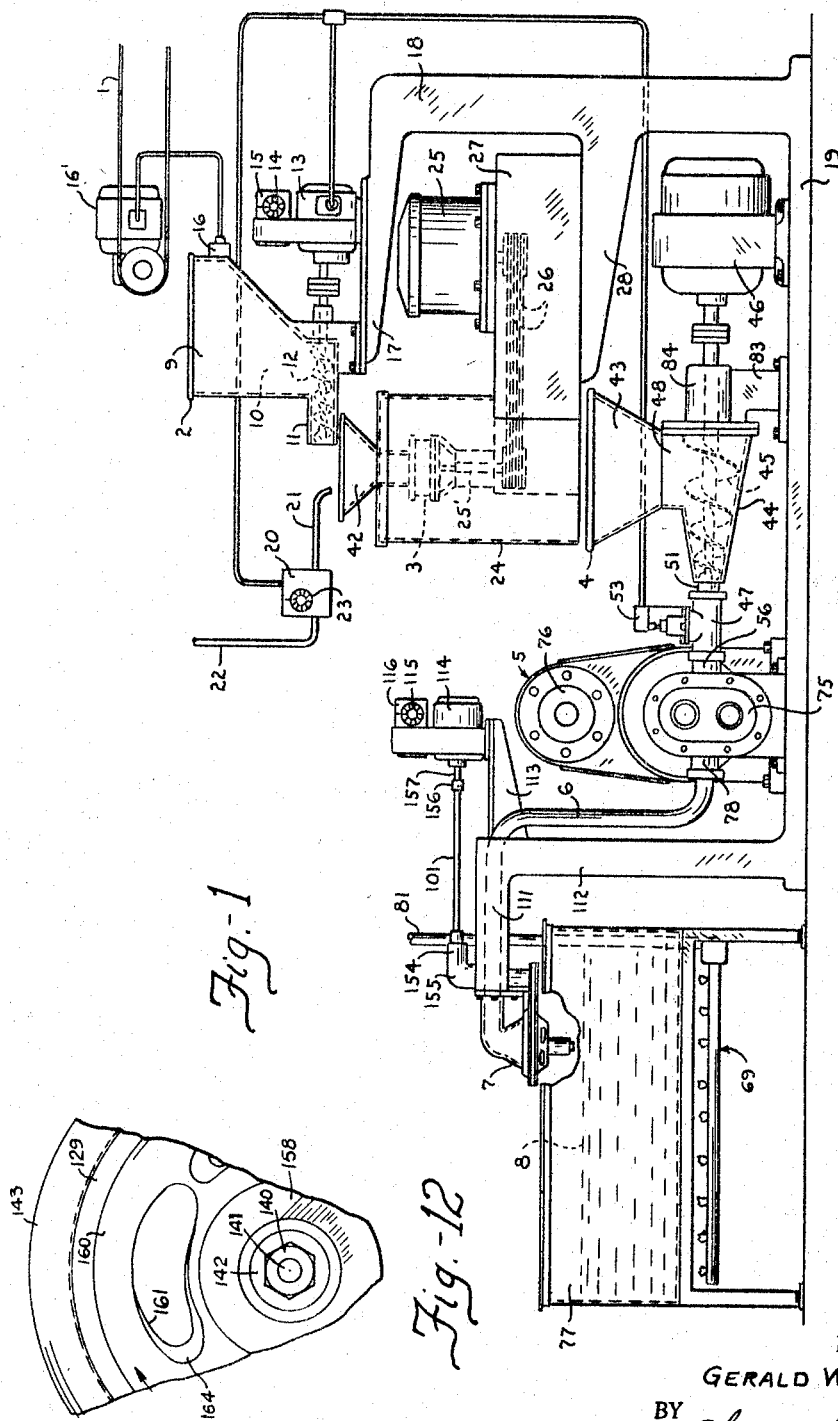

INVENTOR.
GERALD W. URSCHEL
BY
Charles S. Penfold
ATTORNEY

May 23, 1967  G. W. URSCHEL  3,320,905
SYSTEM FOR PROCESSING A PRODUCT
Filed June 1, 1964  4 Sheets-Sheet 4

INVENTOR.
GERALD W. URSCHEL
BY
Charles S. Penfield
ATTORNEY

United States Patent Office 3,320,905
Patented May 23, 1967

3,320,905
SYSTEM FOR PROCESSING A PRODUCT
Gerald W. Urschel, 1614 Napoleon,
Valparaiso, Ind. 46383
Filed June 1, 1964, Ser. No. 371,422
14 Claims. (Cl. 107—14)

The subject invention relates generally to processing equipment and more particularly is directed to an improved apparatus comprising a complete system of continuous or synchronized operations resulting in an extruded food product.

Heretofore, corn has been ground on a stone mill or other suitable grinder. The ground corn is formed into cylindrical shapes and treated with oil to facilitate handling. These shapes are then manually placed in a cylindrical chamber where they are acted upon by a mechanically or hydraulically actuated piston that forces the plastic mass through an opening in an extruding head. The piston is returned to its starting or initial position where the cylinder is opened to accept another load or batch of material and the extrusion cycle is repeated.

The apparatus or system embodying the subject invention or inventions may be employed in processing or conditioning various products but the apparatus disclosed herein has proven to be outstanding in performance with respect to processing and treating a food product such as whole kernels of corn. More particularly, the apparatus is designed and constructed so that it will accept or receive a suitable prepared food product, such as corn, as above alluded to, processing or conditioning it into a plastic mass and then extruding it into predetermined shapes for cooking for further processing.

With the foregoing in mind, one of the principal objects of the subject invention is to provide a system and/or apparatus whereby the complete processing and treatment from the reception of the whole kernel corn to its resultant shape is continuous.

Another objective of the invention is to provide apparatus which substantially eliminates all manual labor and materially increases production by eliminating unproductive time in the loading and extruding cycles inherent in conventional machines as above alluded to.

An important object of the invention is to provide a system whereby to obtain automatic improved methods of processing and control.

A significant object of the invention is to provide apparatus which comprises means for feeding and treating the product by introducing or applying oil, water or other means thereto to control the moisture content or other qualities of the product, means for reducing the size of the product to obtain a desired or predetermined fineness, and means for obtaining deaeration of the product.

An additional object of the invention is to provide a screw feeding structure embodying improved principles of design and construction.

Also, an object of the invention is to provide apparatus offering advantages with respect to adjustability and control to obtain a desirable quality of product, such as uniformity in the texture of the finished or resultant product, synchronism in the operation and efficiency of the various means or components constituting the apparatus, low cost of maintenance, and durability.

Additional objects and advantages will readily become apparent after the description hereinafter set forth is considered in conjunction with the drawings annexed hereto.

In the drawings:

FIGURE 1 illustrates components of the system or apparatus and mode of connecting them for synchronous operation;

FIGURE 2 is an enlarged vertical section taken through a conveying or feeding structure which assists in deaerating and forcing a plastic mass of a material or product to a pump or pressure producing means;

FIGURE 3 is an enlarged vertical section taken through a pressure controlled switch which is operatively associated with the feeding structure and pump above referred to;

FIGURE 4 is an enlarged vertical section taken through a dispensing structure through which the product is extruded;

Figure 13:
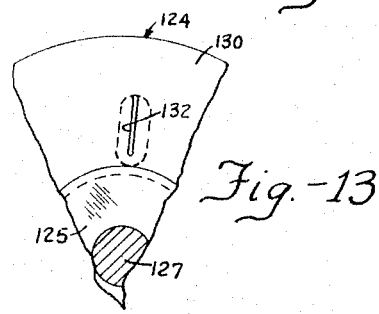

FIGURE 12 is a partial bottom view of a rotatable element operatively associated with a manifold and shows same as being provided with one of a plurality of openings; and FIGURE 13 is a partial bottom view of a plate or member carried by and constituting a bottom wall of the manifold and showing one of a plurality of openings therein through which a product or material is adapted to be extruded and formed into pieces by the rotatable element.

Referring generally to the system or apparatus exemplified in FIGURE 1 there is shown a conveyor 1 for conveying a product such as whole kernels of corn to an assembly comprising a hopper and a feeder 2 for delivery to a reducer means 3 for cutting and materially reducing the size of the product for reception in a unit 4 comprising a hopper and a conveyor which directs the product to pressure producing means generally designated 5 for conduction thereby through a pipe 6 to means 7 from which it is discharged or extruded into desired shapes or pieces for deposit in a bath of hot cooking oil 8.

The hopper and feeder assembly 2 may be designed and constructed in various ways but as shown includes a hopper 9 which receives the product from the conveyor 1 and a lower structure formed to provide a chamber 10 and a tubular extension 11 constituting a continuation of the chamber for receiving a screw 12 which is rotated by a variable speed motor 13 provided with a manually adjustable control 14 of a speed reducer 15 for regulating the speed of the motor. A level indicator 16 is preferably carried by the hopper for maintaining a predetermined quantity or level of the product in the hopper. This indicator is operatively connected to a variable speed motor 16' of the conveyor 1 for controlling or cycling the flow of the product to the assembly 2. The motor for the conveyor is provided with a manual control for regulating its operation. The speed of the screw 12 is preferably regulated so that it will feed slightly more of the product than the desired output in the extrudable means 7 so as to insure an adequate supply to promote uniformity in the discharged resultant product. It will be observed that the assembly 2 is mounted on a platform 17 carried by a pillar 18 extending upwardly from a base 19 of a suitable frame. A dispenser or oil metering device 20 provided with a motor is mounted at a convenient location and includes a reservoir containing a desirable oil or other liquid for dispensation at a controlled rate through an outlet of a pipe 21 to the product as it is introduced to the hopper and/or is being materially reduced in size by the cutting or conditioning action of the reducer means or assembly 3. The reservoir may be connected by pipe 22 to a source of oil, not shown, and provided with manual control 23 whereby its rate of flow may be regulated by controlling the operation of a motor constituting a component of the dispenser. The oil or some other element is preferably utilized to assist in lubricating the product and promoting its flow successively through subassemblies or components of the system.

Figure 6:
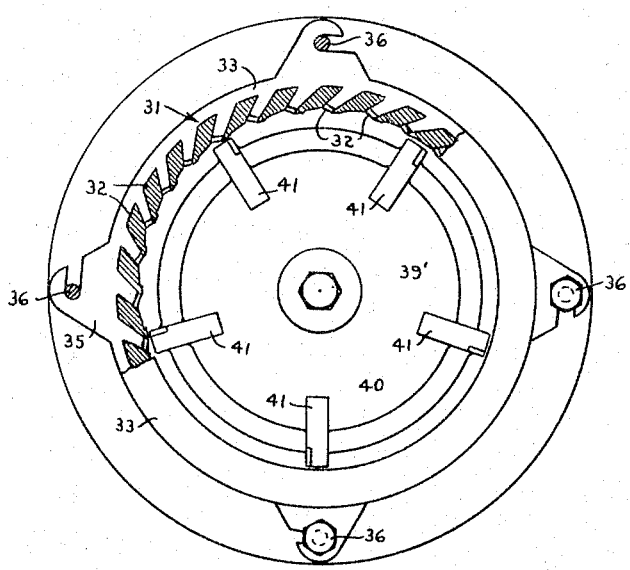
FIGURE 6 is a horizontal sectional view taken substantially on line 6—6 of FIGURE 5.
Figure 7:
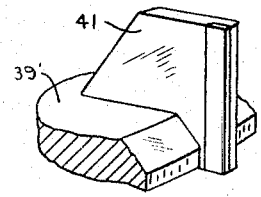
FIGURE 7 is a perspective view of a portion of an impeller, partially in section, constituting a component of the reduction assembly.
Figure 5:
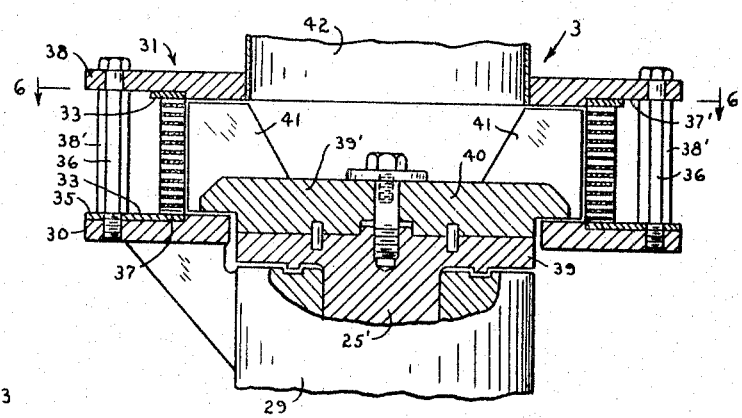
FIGURE 5 is an enlarged partial vertical sectional view of a portion of a size reduction assembly or unit constituting a subassembly or component of the system or apparatus.

The reducer means 3 as exemplified in FIGURES 1, 5 and 6, is preferably located centrally in a vertically disposed tubular guide 24 and operatively connected to a variable speed motor 25, such as by a plurality of V-belts 26 which are carried by pulleys keyed to a drive shaft of the motor 25 and a driven shaft 25' of the reducer 3. An elongate casing 27, extending between and supporting the guide 24 and motor 25, is preferably carried by a shelf 28 extending horizontally from the pillar 18 below the platform 17. The casing 27 serves to support the unit 3 and the motor and enclose the belts and shafts just referred to so as to protect the cut product from contamination while flowing downwardly through the guide into the unit 4.

Figure 8:
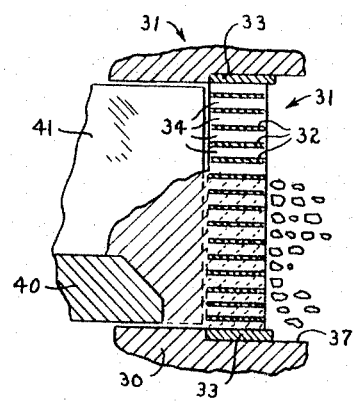
FIGURE 8 is a partial vertical section taken through a part of the structure exemplified in FIGURE 5.

Referring particularly to the structural characteristics of the reducer 3 as exemplified in FIGURES 5, 6 and 8 there is shown in certain of these figures a stationary tubular bearing 29 for the shaft 25', above referred to, and an annular platform 30 disposed in concentric spaced relationship to the bearing. A stationary cutter assembly or mill generally designated 31 is mounted on the platform 30. The assembly may be designed and constructed in various ways but, as depicted, preferably comprises a plurality of axially stacked circumferentially arranged planar segments 32 which are secured between a pair of axially spaced upper and lower annular rings 33. Some of the segments constitute spacers and others are overlapped, with certain of their inner edges constituting cutting surfaces and certain portions defining openings 34 through which the product is discharged generally radially from the reducer. The lower ring may be provided with slotted offsets 35 which receive screws 36 for detachably locating the assembly in a predetermined rotative position in an annular recess or seat 37 provided on the platform 30. An upper plate 38 overlies the assembly and is provided with an annular seat 37' recessing the upper ring and a central opening which receives the lower end of a hopper hereinafter referred to. The screws 36 extend through the plate 38, tubular spaces 38' interposed between the plate and plates, and connect with threaded aperture in the platform for firmly detachably anchoring the assembly between the plate and platform as clearly shown in FIGURE 5.

The shaft 25' above referred to is provided with an enlarged annular head 39 and an impeller 39' is keyed thereto for rotation. The impeller, among other things, comprises a central annular portion 40 which is substantially solid in cross section and a plurality of preferably five circumferentially spaced radially disposed blades 41. The arrangement is preferably such that when the impeller is rotated at a high rate of speed the product entering the reducer 3 through a hopper 42 will be forced radially outward by centrifugal force against the segments or knives 32 for discharge radially through the openings 34 and downwardly from the reducer through the tubular guide 24. The knives condition or cut the product into very fine particles.

The unit 4, above referred to, comprises a housing structure including a funnel 43 disposed below and in axial alignment with the guide 24 and a horizontally disposed conical or tapered tubular cylinder or formation 44 containing a conical or tapered screw 45 which is operatively connected to a variable speed motor 46 for rotating the screw to feed or convey the product through the formation 44 including a T fitting 47 extending axially from the small end of the cylinder. The housing structure also includes a vertical cylindrical portion 48 which joins the funnel 43 and formation 44.

The conical screw 45 as depicted in FIGURE 2 is preferably of the solid center type and the continuous peripheral edge of its spiral or convolutions are disposed in close movable relation to the curved internal surfaces of the cylinder. The convolutions of the screw have impact surfaces 49 which are preferably coated with a friction reducing material or finish 50, such as Teflon, whereby to substantially prevent the material from sticking to the screw. Obviously other portions of the screw and/or internal surfaces of the cylinder may be similarly treated with such a substance. The small end of the conical formation 44 is preferably formed with a short reduced cylindrical extension 51 provided with a radial flange 52 having an annular seat therein. This extension is connected to the fitting 47 and the latter carries a pressure responsive means for actuating a switch 53. The fitting has a cylindrical portion with flanged ends 54 respectively provided with annular seats 55. This cylindrical portion of the fitting has an inside diameter which is substantially the same as that of the extension 51 of the conical formation and a protuberance 56 extending from the pressure producing means 5. The protuberance 56 has a radial flanged end 57 provided with an annular seat 58. Gaskets 59 are secured in the seats by clamping means 60 embracing or connecting the aforesaid radial flanges. With this setup the small end or extremity of the housing structure is supported by the means 5.

The fitting 47, above referred to is also provided with a boss 61 having an opening 62 therein and spaced threaded holes (not shown) disposed about the opening. A body generally designated 64 has a base 65 provided with holes through which screws 66 extend into connection with the threaded holes in the boss for attaching the body to the fitting. The body 64 also has a tubular portion 67 provided with a recess 68 and internal threads and an externally threaded adjustable member 69 is connected to the tubular portions and provided with an aperture in which a stem 70 of a member is reciprocally mounted. The stem carries a head 71 movable in the recess for engaging a resiliently flexible element 72 clamped between the boss 61 and the base 65. This element serves as a seal and is responsive to the pressure of the plastic mass of material which is forced through the fitting 47 by the conical screw 45. A helical spring 73 is disposed in the tubular portion 67 of the body 64. The tension of the spring can be regulated by manipulating the adjustable member 69. The fitting 47 and/or boss 65 of the body 64 may be provided with an upright 74 to which the switch 53 is connected for engagement by the stem 70. This switch serves to control the operation of the motor 13 so that the screw 12 driven thereby will control the flow of the product to the conditioner or reducer 3, including control of the operation of the motor of the oil metering or dispenser device 20.

The pressure producing mans 5, above referred to, preferably comprises a conventional sanitary positive displacement pump 75 driven by a variable speed motor 76. The pump receives the compacted material or plastic mass from the screw 45 via the fitting 47 and the protuberance 56 connecting the fitting to the pump so that the mass is forced through the pipe or conduit 6 to the discharge or extruder means 7 and from the latter into the hot oil 8 contained in a tank 77 as above described. It will be observed that the pipe or conduit 6 is connected to the pump through a protuberance 78 extending laterally from the pump. A heating device generally designated 69 is located below the tank for heating the oil or liquid therein. If desired, the product as released from the extruder means 7 may be deposited onto a mechanical conveyor or subjected to some other treatment or conditioning in lieu of being immersed in cooking oil.

The larger extremity of the conical formation 44 is provided with a radial flange 82 and supported by a standard 83 mounted on the base 19 of the frame. This standard includes a horizontal tubular portion 84 provided with a relatively large radial flange 85 having circumferentially spaced holes 86 extending transversely therethrough which are adapted to register with threaded apertures in the radial flange whereby screws 87 can be extended through the holes into connection with the apertures for attaching the formation to the standard or supporting means.

The tubular portion 84 of the standard is provided with longitudinally spaced annular recesses 88 and 89 in which a pair of roller bearing assemblies 90 are disposed for rotatably supporting a shaft generally designated 91. The recess 88 forms a shoulder 92 and the recess 89 a shoulder 93. The recess 88 is counter-recessed at 94 with an intermediate recess 95 between recesses 88 and 94.

The shaft 91 includes a cylindrical portion 96 of appreciable length which engages the bearing assemblies, an annular head 97 provided with circumferentially spaced threaded apertures 98, a relatively short innermediate cylindrical portion 99 forming a shoulder 100, and a reduced cylindrical end portion 101, the latter extending through an opening 102 provided in end cap 103 connected to the tubular portion by screws 104. The cap preferably carries a seal 105 for engaging the end portion 101 of the shaft and the counter-recess 94 carries a seal 106 for engaging the periphery of the head of the shaft whereby to retain a lubricant substantially within the confines of the tubular portion.

The screw 45 includes an annular radial flange 107 provided with a plurality of circumferentially spaced holes whereby screws 108 can be extended therethrough into connection with the threaded apertures 98 in the head 97 of the shaft for firmly and accurately securing the screw and shaft in axial alignment. A nut assembly 109 is adjustable on the intermediate portion 99 of the shaft for engagement with the adjacent shoulder 100 for adjusting the shaft and screw 45 and maintaining the bearing assemblies 90 engaged with the shoulders 92 and 93. The shaft and screw, as a unit, is supported for rotation by the standard 83 independently of the formation 44, the latter of which is supported by the standard including the pump 75 as alluded to above.

The extruder means 7 exemplified in FIGURE 1 and particularly in FIGURE 4 will now be described. It will be observed that the extruder means is carried by a horizontal member 111 overhanging the tank and that this member extends from a pillar 112. A shelf 113 also extends from the pillar and supports a variable speed motor 114 for driving a movable element of the extruder in a manner to be subsequently described. This motor is provided with a manual control 115 for controlling the speed of a reducer 116 associated with the motor.

The extruder means 7 may be designed and constructed in various ways, but, as exemplified herein, includes a manifold or housing having a tubular portion 117, flange, 118, a frusto-conical portion 119 forming a chamber 120, and an outwardly extending annular flange 121 is provided with circumferentially spaced holes 122. The frusto-conical portion 119 is preferably reinforced by a vertical web 123 joining this portion with the flange 118.

A member or plate, generally designated 124, is detachably secured to the housing to constitute a bottom wall thereof. This member is preferably formed to provide a central conical portion 125 extending into the chamber 120 so that material flowing under pressure through the portion or entrance 117 and chamber will be parted or divided for divergent or conical flow with reference to the vertical axis of the manifold as depicted by the lowermost arrows in FIGURE 4. The conical portion or hub 125, in combination with the frusto-conical portion 119 of the housing, form what may be termed a conical or tapered annular passage disposed in concentric relation to the vertical axis of the manifold. The conical portion 125 of the member 124 is preferably provided with a cylindrical axial bore 126 in which the upper end of a shaft 127 is sationarily secured by a set screw 128 A rotatable element generally designated 129, which will be described more in detail later, is journaled on the shaft 127.

The member 124 is also formed to provide an annular portion 130 surrounding the conical portion 125 and is disposed at an oblique angle with reference to the vertical axis of the manifold. The periphery of the portion 130 is detachably held against the flange 121 of the manifold housing by screws 131 which extend through the apertures 122 in this flange and threadably connect with tapped holes provided therefor in such peripheral portion.

The annular portion 130 is preferably provided with a plurality of five corresponding circumferentially spaced radially extending narrow slots 132, the inner ends of which terminate adjacent the conical portion 125 and their outer ends at spaced locations inset equally from the periphery of the member. The portion 130 may also be provided with converging surfaces 133 which serve to assist in piloting the material and defining relatively sharp edges 134.

The rotatable element 129 and its operative relationship with the member 124 will now be described. This element serves to control and vary the width or size of the slots or openings 132 in the member 124 in a manner whereby to separate and shape the mass of material or product into pieces at the points or locations of extrusion. This element may be designed and constructed in various ways but, as disclosed herein, is formed to include a cylindrical tubular hub 135 having a bore therein which rotatably receives the stationary shaft 127 carried by the member 124. The lower end of the hub 135 is preferably recessed at 136 and receives a ball bearing assembly 137 which embraces a reduced cylindrical portion 138 of the shaft and engages a shoulder 139 thereon. A nut 140 is connected to a threaded portion 141 of the shaft and bears against a washer 142 which in turn engages the bearing assembly 137. With this setup the rotatable element is detachably mounted for rotation relative to the member 124. The element 129 has a V-shaped peripheral portion 143 which receives a belt 144, the latter being connected to a pulley 145 carried by a vertical shaft 146 journaled in a bearing structure 147. The shaft 146 also carries a gear 148 at its upper end which meshes with a gear 149 keyed to a horizontal shaft 150. The shaft 150 is journaled on spaced bearings 151 supported in a tubular bearing sleeve 152 fixedly secured by a screw 153 in a tubular portion 154 of an elbow or shroud 155 mounted on the bracket 110. The shaft 150 is connected by a coupling 156 to a shaft 157 of the motor 114.

The rotatable element 129 also includes an annular radial flange 158 adjacent the upper end of the hub 135 and this flange and a flange 159 carrying the V-portion 143 are joined by a conical or inclined annular portion 160 provided with a plurality of circumferentially spaced shaping means, preferably in the form of openings 161. It will be observed that the inclined portion 160 mates and intimately slides against the external surface of the member 124 and in order to insure an efficient rotary sliding engagement a gap 162 is preferably provided between a lower surface of the conical portion 125 of the member 124 and an upper surface of the inner radial flange 158 or upper part of the hub 135.

The openings 161 provided in the rotatable element 129 are so designed and constructed that they will form pieces from the material extruded through the slots or openings 132, when the element is rotated in a clockwise direction relative to the member 124. It will be observed that the openings in the element are preferably respectively formed to provide inner continuous relatively sharp edges 163 which slide relative to the relatively sharp edges 134 defining the radial slots or openings in the member 124. In order to additionally insure an efficient forming action on the mass extruded through the openings or slots 132, the openings 161, which also receive the pieces, are provided with bevelled divergent clearance surfaces 164 so that the pieces as formed will be free to directly fall, for example, into the bath of cooking oil 8. The surfaces 134 and 164 may be treated with Teflon to reduce frictional resistance to the flow of material. Due to the relative conical positions of portions of the member and element the pieces of the product are dispensed in a conical path or pattern in order to promote their separation. This factor is particularly important in those instances where a material having a high viscosity or adhesiveness is run through the system.

It will be further observed in FIGURE 4 that the horizontal member 111 extending from the pillar 112 is channel in shape and has an end wall 165 provided with an opening 166 therein which is aligned with the tubular portion 117 of the manifold of the extruder means 7. The pipe or conduit 6 has an upper horizontal extremity 167 which is substantially disposed in the channel and extends through the opening 166 into the tubular portion 117. The extremity 167 may be provided with an external annular bead or abutment 168, which is preferably held against the inner surface of the end wall 165 of the channel by a ring 169 and screws 170 extending through the ring into the end wall. The ring is preferably provided with an annular recess 171 which received the bead. Obviously, the pipe or conduit 6 may be communicatively connected to the extruder head in different ways than the one disclosed herein.

Figure 11:
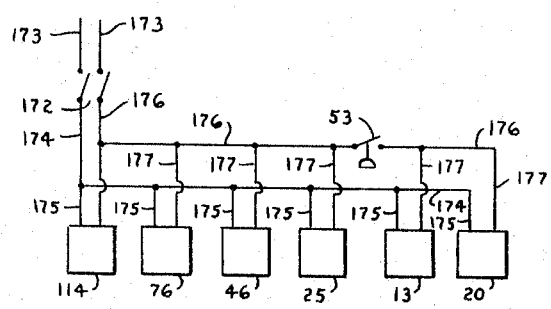
FIGURE 11 is a diagram of the electrical circuiting of the system.

The electrical circuitry as exemplified in FIGURE 11 of the drawing includes a plug 172, diagrammatically shown, which is adapted for connection with the source 173. A common conductor 174 extends from the plug and is connected by branch conductors 175 to the motors 114, 76, 46, 25, 13 and to the motor of the dispenser 20. Another common conductor 176 is connected by branch conductors 177 to the aforesaid motors. The pressure responsive switch 53 is interposed in the common conductor 176 between the branch conductors leading to the motors 25 and 13 and as a consequence thereof the motor 13 for operating the screw conveyor 12 and the motor for the dispenser 20 are both subject to or under the control of the switch. If, for example, the pressure exerted by the plastic mass or material being forced through the T-fitting 47 by the conical screw 45 is insufficient to flex the element 72 to effect actuation of the stem 70 to operate the switch 53, the system will continue to function and force the mass through the conduit 6 for extrusion through the means 5. However, when the pressure exerted by the mass flowing through the fitting 47 obtains a predetermined value indicating an oversupply of the mass for extrusion, the switch 53 will interrupt the flow of current to the motors for the dispenser 20 and screw 12 so they are automatically rendered inoperative to prevent delivery of the product to the reducer 3 and the liquid or oil to the product.

In view of the foregoing, the operation of the system or apparatus may be described as follows:

The product is conveyed by the conveyor 1 to the hopper and feeder assembly 2 and the level of the product in the assembly 2 is maintained by the level control indicator 16. The screw 12 of the assembly 2 feeds the product into the reducer or cutting mill 3 through the hopper 42. The speed of this screw is regulated by a power means, such as the variable speed motor 13, for the purpose of feeding slightly more of the product than the desired output in the extruder means 7 so the latter always has an adequate supply available to promote uniformity in the resultant product. More particularly, the feed screw is of the "on" or "off" type and cycled by the control means or switch 53 whereby to synchronize the input to the output capacity of the system. Oil or some other desirable medium is applied to the product and/or into the reducer 3 through the dispenser or metering pump 20.

The product is conditioned, comminuted or finely cut by the reducer 3 and is expelled therefrom so that it may fall by gravity through the guide 24 into the hopper 43 of the unit 4 where the conical screw 45 serves to compact and deaerate the loose conditioned or ground particles from the reducer or mill 3 and force the compacted product or plastic mass into the pressure producing means or pump 75. The screw, in compacting the material, effects a kneading action thereto and this serves to deaerate it and thereby improved uniformity in the texture of the resultant product. The screw 45 is driven by a power means, such as the variable speed motor 46. The speed of this motor may be adjusted to obtain qualities desired in the treated product, or mass, such as improving its condition with respect to pliability, adhesiveness, plasticity and extrusion. The screw 45 is preferably coated with friction reducing material as set forth above.

The adjustable pressure switch 53, as alluded to above, controls the motor 13 which drives the screw 12 and the oil metering pump or dispenser 20 in an "off" or "on" cycle. When an excess of the product falls into the hopper for compaction and conveyance by the screw 45 the screw will fill the conical housing 44 further toward the product entrance end and create an excess pressure at its exit or small end. This pressure activates the pressure switch, which in turn turns off the motor 13 and thereby corrects for an excess flow of the material by the conical screw 45. As the conical cavity of the housing is emptied by the screw 45, the pressure in the exit end is reduced and, as a consequence, actuates the pressure switch 53 to operate the motor 13 to again initiate rotation of the screw 12 and operation of the oil dispenser.

The pressure reducing means 5, as pointed out above, preferably includes the conventional sanitary positive displacement pump 75 and this pump is operated by the motor 76. The speed of this motor or pump is adjusted to pump the desired output capacity to the extruder means 7 through the pipe or conduit 6.

The extruder means 7 is designed and constructed to fully restrict, partially restrict, or not restrict the openings 132 in the stationary member or plate 124. This organization permits a desirable control of the cross-sectional characteristics or form of the extrusion and separation of the extrusion into pieces of predetermined sizes or lengths. The rotatable element 129 is driven or operated by the variable speed motor 114. Power is transmitted to the element 129 by the operatively connected shafts 146 and 150 and the belt and the pulley drive between one of the shafts and the rotatable element. Obviously, means other that that shown may be employed whereby to rotate or drive the element 129. The speed of rotation of the element 129 determines the length or size of the extruded pieces and the shape of the pieces may be modified by changing the character of the openings 161 in the element. The extruded pieces are adapted to drop from the extruder head into the bath 8 of hot oil for cooking or, if desired, onto a belt for dehydrization or any other desired type of processing.

It is to be understood that, if found desirable, a comminuted or otherwise prepared product could be delivered to the hopper 43 of the unit 4 and that the input flow thereto could be controlled by the switch 53 so that the system or machine would function as a quality controlled continuous extruder.

Figure 9:
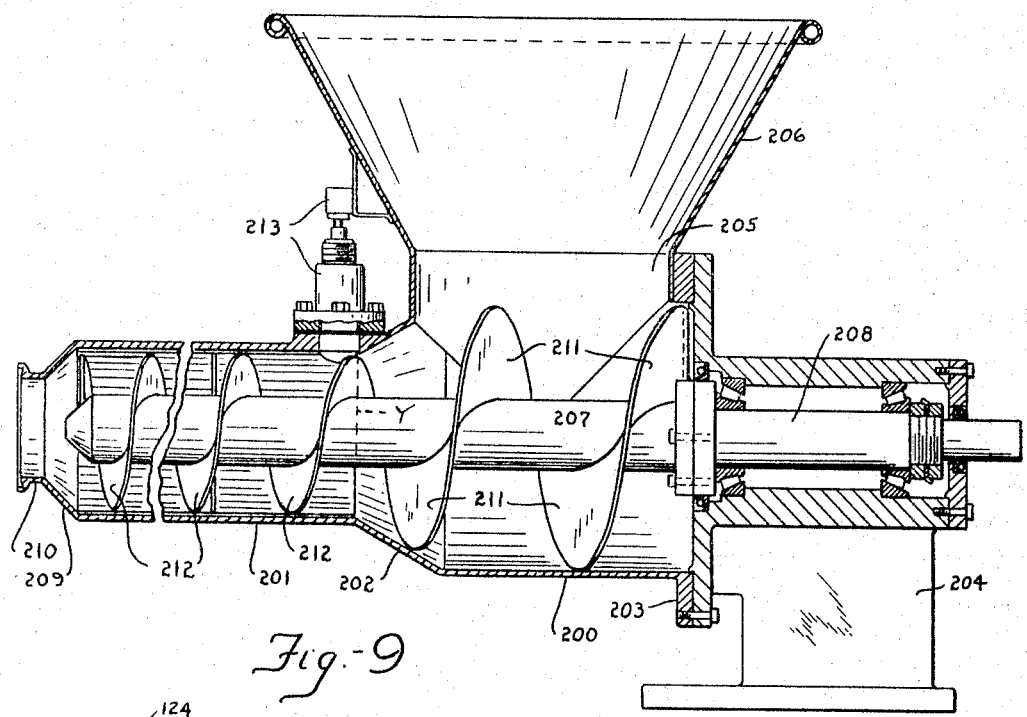
FIGURE 9 is a vertical section taken through a modified form of feeder assembly.
Figure 10:
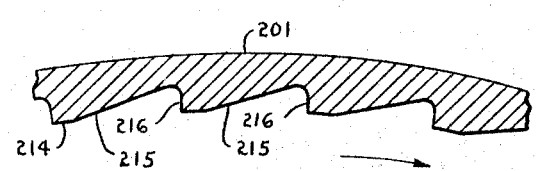
FIGURE 10 is a partial transverse section taken through a wall of a housing of the feeder assembly shown in FIGURE 9, depicting longitudinal grooves or recesses interrupting an internal cylindrical surface of the housing.

Referring now to the modified form or embodiment of the feeder or conveyor means exemplified in FIGURES 9 and 10, there is shown a tubular substantially horizontal housing structure comprising a relatively large cylindrical extremity 200, a relatively smaller cylindrical extremity 201, and an intermediate or conical portion 202 joining the extremities.

The large extremity is provided with an annular radial flange 203 for attachment to a support 204 and with an upper vertically disposed formation comprising a cylindrical portion 205 and a funnel 206 to facilitate introduction of the finely ground product from the reducer or mill 3 into the large extremity 200 of the housing. The flange 203 provides for attachment of the housing to the support in a mode substantially corresponding to that in which the housing 44, above referred to, is attached to the support 83.

The small extremity 201 is relatively long or of a predetermined length in order to afford sufficient working of the product by a screw 207 operatively connected to and supported solely by a driven shaft 208 journalled in the support 204. The small extremity is provided with a relatively short conical portion 209 and an adjacent short reduced cylindrical portion 210, the latter of which facilitates connection of the housing to a pressure producing means or pump in a mode substantially corresponding to that connecting the housing 44 to the pump 5.

The screw 207 is preferably of the solid center type and includes tapering convolutions or portions 211 disposed within the confines of the large extremity 200 and the conical portion 202 and corresponding convolutions 212 disposed within the confines of the smaller extremity 201.

It will be observed that a pressure responsive switch structure 213 is preferably disposed on the smaller extremity 201 or at the junction between the intermediate conical portion 202 and the smaller cylindrical extremity. Attention is also directed to the fact that the switch is of a preset type and not adjustable, as distinguished from the adjustable components associated with the switch 53 above described. These features, including the fact that the housing has a longer extremity and the screw is longer, distinguishes this modified structure of FIGURES 9 and 10 from that shown in FIGURES 2 and 3.

There are at least two principal objectives or purposes for utilizing the feeder or conveyor structure exemplified in FIGURES 2 and 9. One is to force feed or convey the material or mass into a positive displacement pump or pressure producing means. This is desirable due to the high viscosity of the mass being pumped. The second purpose is to work the mass to change or modify its quality or character. This working of the mass is accomplished by changing the speed of the rotating screw. At higher speeds, more slippage and thus more working will occur.

Attention is directed to the fact that in the feeder structure shown in FIGURES 2 and 3, the speed of the screw is adjusted to accomplish the amount of material working desired. The adjustable pressure switch or components associated therewith are then set to actuate at a pressure at which the material fills the housing to a point, line or location which is indicated at X. Any variation in the desired working of the material or mass necessitates readjustment of both the screw and the switch. Also, any change in the viscosity of the material necessitates changing the screw speed and/or the switch.

The modified variation of the feeder structure shown in FIGURES 9 and 10 as distinguished from the feeder structure exemplified in FIGURES 2 and 3 serves to eliminate the necessity of constant or periodic adjustment and eliminate the interdependence of one control to the other. In the modified structure, the speed of the screw is set to give a desired amount of mass or material working. The pressure switch is non-adjustable and preset so that a minimum pressure allows the material to fill the housing to a point, location or area as indicated at Y. This preset switch then cycles or functions "on" and "off" to control the input of the material and thereby maintains approximately the same amount or quantity of material in the housing. By changing or modifying the speed of the screw, varying degrees of material working may be obtained. No adjustment of the switch is necessary as this switch acts only as a quantity control and is not dependent on the pressure generated at the discharge end of the housing.

As exemplified in FIGURE 10, an inner cylindrical surface 214 of the smaller extremity 201 may be interrupted or provided with a plurality of corresponding circumferentially spaced longitudinally extending flutes, recesses or grooves. Each of the grooves is preferably defined by a substantially planar area 215 and a cove area 216. The flutes serve to receive and retard rotation of the mass when the screw is being rotated in a direction toward the coves while allowing the material to flow longitudinally in the flutes toward the discharge end of the smaller extremity of the housing structure.

It is to be understood that, although the machine or system has been satisfactorily utilized to process whole kernels of corn, other food products may be processed by the system. In other words, no limitation is to be implied with respect to the use of the word "product" or "mass."

In a relatively broad sense, the system above described comprises means for extruding a compacted flowable mass into pieces, means for compacting the product into the compact mass, pressure producing means for conducting the mass to the extruding means, and means associated with the compacting means for controlling the amount of the mass conducted to the extruding means.

Having thus described my invention, it is obvious that various modifications may be made in the same without departing from the spirit of the invention, and therefore, I do not wish to be understood as limiting myself to the exact forms, constructions, arrangements, and combinations of parts herein shown and described.

I claim:

1. A system for processing a product, said system comprising means for comminuting the product, means for applying liquid to the product while it is being comminuted, means for feeding the product to said comminuting means, means for conveying the product to said feeding means, means for severing the comminuted product into pieces, pressure producing means for forcing the comminuted product through said severing means, means for receiving the comminuted product from said comminuting means, and means associated with said receiving means for compacting and conveying the comminuted product to said pressure producing means.

2. A system for processing a food product, said system comprising means for reducing the size of a product, means for feeding the product to said reducing means, means for extruding the product into individual pieces, pressure producing means, means for receiving and compacting the reduced product into a plastic mass and causing it to flow to said pressure producing means whereby the latter continually forces the mass to and through said extruding means, and means associated with said last-mentioned means responsive to a condition of the mass for controlling the operation of said feeding means.

3. A system for processing a food product, such as whole kernels of corn, said system comprising means for conditioning the product, means for feeding the product to said conditioning means, means for discharging the conditioned product into pieces after it is compacted into a plastic mass, pressure producing means for continually forcing the mass through said discharging means, means for receiving the conditioned product from said conditioning means, means associated with said receiving means for compacting the product into a compact plastic mass and causing it to flow to said pressure producing means, and means responsive to the pressure exerted by the mass for controlling the operation of said feeding means.

4. A system for processing a product, said system comprising means for reducing the size of a product, means for feeding the product to said reducing means, means for dispensing a liquid to the product at a location between said reducing means and said feeding means, means for extruding the product into individual pieces after it is compacted into a flowable mass, pressure producing means, means for receiving, compacting and conveying the compacted product to said pressure producing means whereby the latter forces the compacted product to and through said extruding means, and means for determining a condition of the compacted product for controlling the operation of said dispensing means.

5. The system defined in claim 4, in which said determining means also controls the operation of said feeding means.

6. A system for processing a product, said system comprising means for extruding the product, means for compacting the product into a mass, pressure producing means for continually conducting the mass to said extruding means, means associated with said compacting means for controlling the amount of the mass conducted to said extruding means, said extruding means comprising a manifold provided with a discharge opening through which the mass is extruded, and rotatable means for separating the mass into pieces during extrusion.

7. Apparatus of the character described comprising means for extruding a plastic flowable product into pieces, a tubular structure having a large cylindrical extremity for receiving the product, a small cylindrical extremity provided with an outlet and an intermediate tapered portion, a screw having a conical portion disposed in said large extremity and intermediate portion and a portion of substantially uniform diameter disposed in said smaller extremity, means for rotating the screw to compact the product received into a plastic mass and causing it to flow through said outlet, and pressure producing means communicatively connected to said extruding means and said outlet for receiving the mass from the latter and forcing it to and through said extruding means.

8. The apparatus defined in claim 7, including means located adjacent said tapered portion for maintaining substantially a uniform condition in the mass prior to its reception by said pressure producing means.

9. In combination: means for reducing the size of a product, means for feeding the product to said reducing means, means for receiving the reduced product from said reducing means and provided with an outlet, means in said receiving means for compacting the reduced product into a compact plastic flowable mass whereby to assist in deaerating the same and force it through said outlet, means adjacent said outlet for automatically controlling the operation of said feeding means, a manifold spaced from said outlet and provided with a discharge opening, pressure producing means operatively connected to said outlet, conduit means connecting said pressure producing means and said manifold for conducting the mass to said manifold and extruding it through said opening, and rotatable means for separating the mass into pieces during extrusion.

10. In combination: means for reducing the size of a product, means for feeding the product to said reducing means, means for receiving the reduced product from said reducing means and provided with an outlet, means in said receiving means for compacting the reduced product into a compact plastic flowable mass whereby to deaerate the same and force it through said outlet, means adjacent said outlet responsive to a condition of the mass, means connecting said feeding means and said responsive means whereby the latter controls the former, a manifold provided with a discharge opening, means operatively connecting said outlet and said manifold for conducting the mass to the latter for extrusion through said opening, and means for severing the mass into pieces during its extrusion.

11. A system of the kind described comprising means for extruding a product into pieces, means for compacting the product into a compact mass and conveying means for conveying the product to said compacting means, means for receiving the mass and pressure feeding it to said extruding means, means associated with said compacting means responsive to a condition of the mass, means connecting said compacting means and said responsive means whereby the latter controls the operation of said conveying means, a manifold provided with a discharge opening, means operatively connecting a said outlet and said manifold for conducting the mass to the latter for extrusion through said opening, and means for severing the mass into pieces during its extrusion.

12. A housing of the kind described, said housing comprising a large cylindrical extremity provided with an entrance for receiving a product, a smaller cylindrical elongate extremity, a conical intermediate portion joining said extremities, said smaller extremity being provided with an opening, means for facilitating connection of said opening with a pressure producing means, and said smaller extremity also being provided with internal circumferentially spaced longitudinally extending abutment means for retarding spiral flow of the product when forced through said housing.

13. The housing defined in claim 12, including means mounted externally of said housing adjacent said opening and being responsive to the pressure exerted by the product traveling through said housing, and a switch actuable by said responsive means.

14. In combination: means for conditioning a product and means for extruding and separating the product into pieces; said conditioning means comprising an annular wall structure provided with internal means and discharge openings and an impeller rotatable in the annular structure for directing the product against said internal means for reducing its size and forcing the reduced product through said openings; said extruding and separating means comprising a housing forming a chamber provided with an aperture and means rotatable in close relation to said aperture for opening and closing the same to form and separate the reduced product when extruded therethrough; means for conducting the reduced product discharged from said conditioning means to said chamber; and means for forcing the reduced product from said chamber for passage through said aperture.

References Cited by the Examiner

UNITED STATES PATENTS

| | | | |
|---|---|---|---|
| 1,158,908 | 11/1915 | Ehrhart | 107—14.4 |
| 1,484,179 | 2/1924 | McClure et al. | |
| 1,868,183 | 7/1932 | Sweet | 99—353 |
| 2,139,933 | 12/1938 | Chenoweth | 99—235 |
| 2,674,396 | 4/1954 | Peterson | 100—45 X |
| 2,680,880 | 6/1954 | Corbett. | |
| 3,050,771 | 8/1962 | Mylchreest. | |
| 3,075,456 | 1/1963 | Uschmann. | |
| 3,110,420 | 11/1963 | Brewer | 18—12 |
| 3,110,930 | 11/1963 | Beck | 18—8 |
| 3,178,770 | 4/1965 | Willis. | |
| 3,181,482 | 5/1965 | Heth et al. | 107—4 |
| 3,202,084 | 8/1965 | Hale et al. | 107—14 X |
| 3,218,786 | 11/1965 | Johnson et al. | 107—14 X |

FOREIGN PATENTS

| | | |
|---|---|---|
| 584,306 | 11/1924 | France. |
| 849,726 | 9/1960 | Great Britain. |

BILLY J. WILHITE, *Primary Examiner.*